United States Patent [19]

Devarakonda et al.

[11] Patent Number: 5,784,459

[45] Date of Patent: Jul. 21, 1998

[54] METHOD AND APPARATUS FOR SECURE, REMOTE SWAPPING OF MEMORY RESIDENT ACTIVE ENTITIES

[75] Inventors: Murthy Devarakonda, Briarcliff Manor; William H. Tetzlaff, Mount Kisco; Deborra Jean Zukowski, Yorktown, all of N.Y.

[73] Assignee: International Business Machines Corporation, Armonk, N.Y.

[21] Appl. No.: 698,540

[22] Filed: Aug. 15, 1996

[51] Int. Cl.⁶ .............................. H04L 9/00; G06F 12/12
[52] U.S. Cl. ........................ 380/4; 380/3; 380/49; 395/186
[58] Field of Search ................. 380/4, 49, 3; 395/186, 395/187.01

[56] References Cited

U.S. PATENT DOCUMENTS

| | | | |
|---|---|---|---|
| 4,218,582 | 8/1980 | Hellman et al. | 380/30 |
| 4,525,599 | 6/1985 | Curran et al. | 380/4 |
| 4,558,176 | 12/1985 | Arnold et al. | 380/4 |
| 4,868,738 | 9/1989 | Kish et al. | 395/846 |
| 4,926,476 | 5/1990 | Covey et al. | 380/4 |
| 5,167,030 | 11/1992 | Spilo | 395/200.51 |
| 5,191,611 | 3/1993 | Lang | 380/25 |
| 5,247,670 | 9/1993 | Matsunaga | 395/200.33 |
| 5,249,231 | 9/1993 | Covey et al. | 380/25 |
| 5,249,232 | 9/1993 | Erbes et al. | 380/49 |
| 5,315,655 | 5/1994 | Chaplin | 380/4 |
| 5,343,525 | 8/1994 | Hung et al. | 380/4 |
| 5,394,469 | 1/1974 | Nagel et al. | 380/4 |
| 5,452,447 | 9/1995 | Nelson et al. | 395/621 |
| 5,559,889 | 9/1996 | Easter et al. | 380/30 |
| 5,592,549 | 1/1974 | Nagel et al. | 380/4 |

OTHER PUBLICATIONS

Matt Blaze, "A Cryptographic File System", Proc. 1st ACM Conference on Communication and Computing Security, Nov. 1993.

*Primary Examiner*—Thomas H. Tarcza
*Assistant Examiner*—Pinchus M. Laufer
*Attorney, Agent, or Firm*—Scully, Scott Murphy and Presser

[57] ABSTRACT

A method and apparatus for providing a network computer with secure remote swapping to avoid transmitting active memory resident entities (such as data structures, pages, and segments) containing sensitive data in the clear. When a memory resident entity is created, it is entered in a Table of Secure Entities (TSE) if it requires security. The memory manager of the network computer checks the TSE for an entity before swapping it out to a network server. If the entity is in the TSE, the memory manager encrypts the contents of the entity using the public key from the network computer's SmartCard device. When reloading the entity, the memory manager uses the private key from the SmartCard to decrypt the contents of the entity.

20 Claims, 4 Drawing Sheets

1

METHOD AND APPARATUS FOR SECURE, REMOTE SWAPPING OF MEMORY RESIDENT ACTIVE ENTITIES

I. BACKGROUND OF THE INVENTION a. Field of the Invention

This invention relates to remote swapping of memory resident entities in network connected computers.

b. Related Art

As the network computing paradigm becomes ubiquitous, simplified inexpensive desktop computers, known as the network computers, that have no means of independent existence will become a commonplace. Such devices may run a low function operating system (for simplicity) and rely on servers for basic system services including the swap area for the active entities in the memory, storage, printing, and so on.

The existing approaches to providing these basic system services include a full-featured operating system and local disk storage. However, in order to reduce the cost and management complexity, network computers are not usually configured with a local disk and a full featured operating system.

Some prior art distributed file systems, such as the Sun NFS, support swapping of pages and segments over the network to a server. U.S. Pat. No. 4,868,738 describes another system for virtual memory management which uses a dedicated processing unit for memory management and the swapping of memory blocks over a network. These conventional systems do not, however, provide a secure means of swapping the pages or segments. Therefore, the data being transferred back and forth from the network computer to the server is prone to security attacks. For example, it would be easy to read the contents of a page or pages using a simple network tap or even another network computer attached to the same physical network. This would be serious violation of privacy that the users of the desktop systems come to expect.

Thus, there is a need to provide network computers with secure remote paging to avoid transmitting active memory resident entities (such as data structures, pages, and segments) containing sensitive data in the clear.

Various systems and methods for encrypting data and transmitting the data over an otherwise insecure channel are known in the art. An example of such an encryption system and method is disclosed in U.S. Pat. No. 4,218,582.

II. SUMMARY OF THE INVENTION

In view of the foregoing, this invention includes a computing system which uses an encryption process (which in a preferred embodiment is an encryption variation of the public encryption scheme), a table of secure entities and storage for the encryption keys and the logic to use the table and encryption method for secure remote paging.

In a preferred embodiment, the active entities containing sensitive data are listed in a table of secure entities. When the computing system's virtual memory manager is transferring an entity to a remote server, it encrypts the entity with the system's public encryption key. When reloading the page, the virtual memory manager uses the system's private key to decrypt the data.

III. BRIEF DESCRIPTION OF THE DRAWING

The present invention will be understood by reference to the drawing, wherein:

2

IV. DETAILED DESCRIPTION OF THE PREFERRED EMBODIMENT

Figure 1:
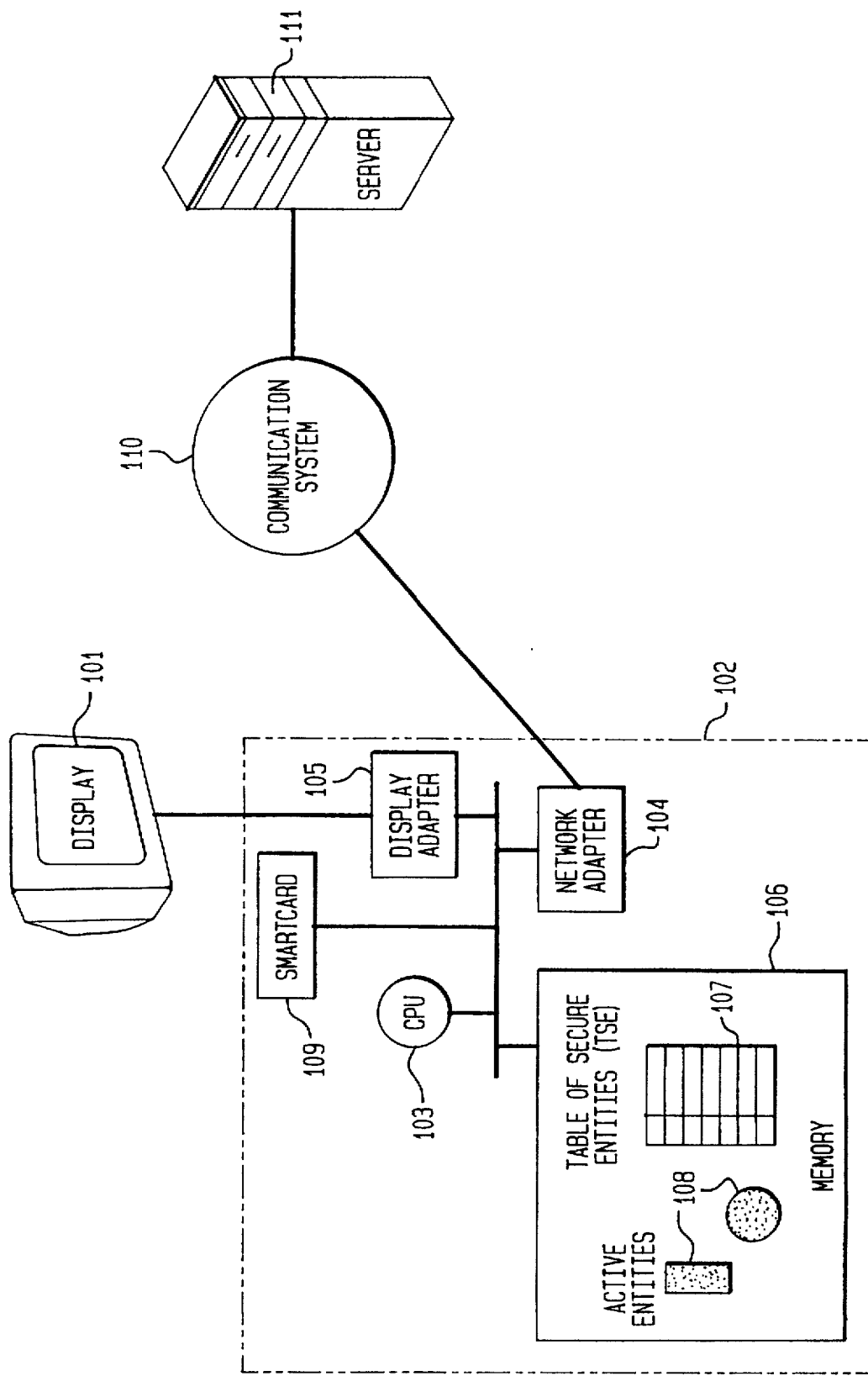
FIG. 1 depicts a loosely coupled system suitable for use with the present invention.

A loosely coupled system suitable for use with the present invention is illustrated in FIG. 1. The system includes a network computer 102, a communication network 110, and a computer system functioning as the server 111. The network computer includes internal components 103–109 and a display device 101. In particular, the internal components of the network computer include a CPU (a Central Processing Unit) 103 such as a Pentium, semiconductor memory 106, a network adaptor 104 that enables communication with the communication network, a display adaptor 105 that drives a display device 101, and a SmartCard device 109. The SmartCard device contains either a removable or non-removable media. In the case of a non-removable media, the SmartCard stores encryption keys for the network computer, and in the case of removable media, it preferably stores encryption keys specific to the user. Those of skill in the art will recognize that the network computer 102 will include other conventional components such as a keyboard and mouse input devices though these are not shown in the figure and will not be discussed in further detail.

As needed by a user application such as the Lotus Notes mail application, active entities 108 such as data structures, objects, pages, and segments are created to reside in the semiconductor memory. If security is needed for these entities, they are registered in a table (the table being formed and stored in the random access memory of the network computer 102) called Table of Secure Entities (TSE) 107. The network computer 102 can be embodied, for example, on a Java machine or internet terminal. Those of skill in the art will also recognize that a conventional desktop computer such as an IBM Aptiva or IBM PC could be provided with the appropriate software and network interface and used as the network computer 102. The communication protocol is HTTP and TCP/IP. The network 110 can be, for example, a token ring. The server system 111 can be embodied, for example, on IBM RISC System/6000 machine using AIX 4.2.

Figure 2:
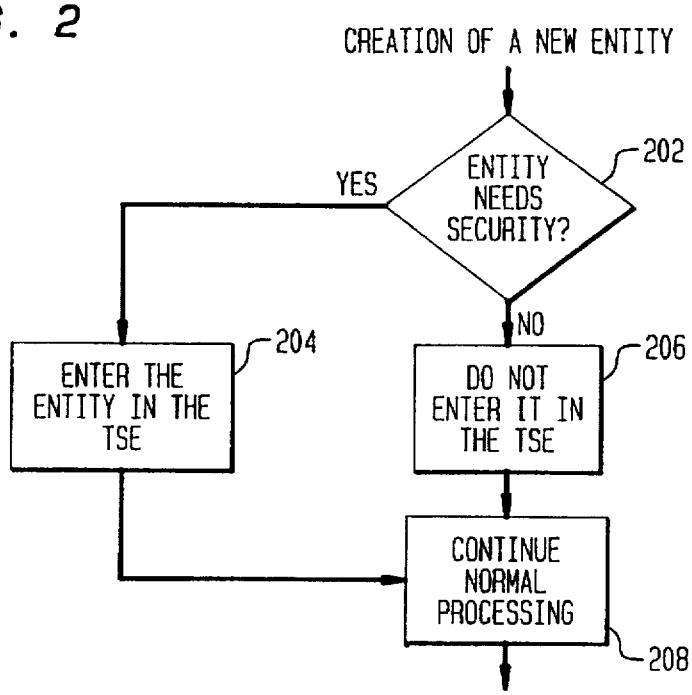
FIG. 2 shows the flow chart describing the steps taken during the creation of active memory resident entities.

According to an embodiment of the present invention, when a new memory resident entry is being created, the application has an option to indicate whether the entity requires security or not. The resident entity creation process is shown in FIG. 2. In step 202 the resident entity creation routine (a program module called by the operating system) checks to see if the application has provided such an indication. For example, if the entity being created is a memory page to store a mail message that a user is composing, the mail program may indicate that the page should be handled securely. If the entity to be created requires secure handling in step 204 an entry is made in the TSE for the page. Otherwise, step 206 is executed and no actions are taken on the TSE. In step 208 the routine continues by performing conventional memory entity creation processing.

Figure 3:
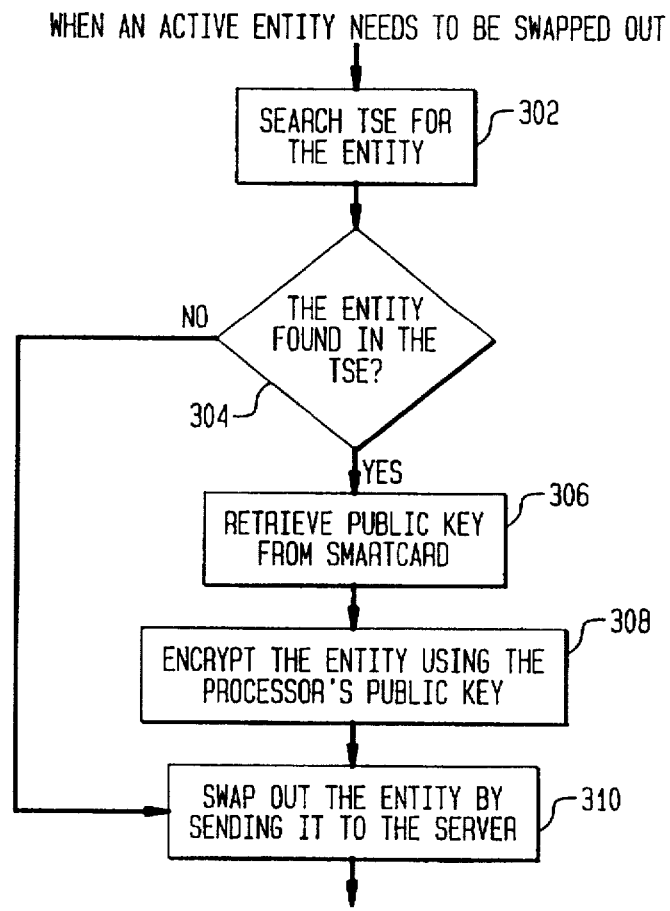
FIG. 3 shows the flow chart for swapping out an active memory resident entity.

When an active memory resident entity needs to swapped out, the operating system calls a swapper module in the network computer. The swapper module, the operation of which is shown in FIG. 3, performs the following steps. In step 302 the swapper module searches the TSE for the entities registration entry (i.e. it determines if the entity has been registered in the TSE). If, in step 304, it is determined that the entity has been registered in the TSE, in step 306 the public key is retrieved from the SmartCard. Then, in step 308, the contents of the entity are encrypted using the public key retrieved in step 306. In step 310 the entity (in encrypted or unencrypted form depending on the results of the determination in step 304, is swapped out of the network computers local memory by being sent to the server 111 (via the communication system 110) for saving to its local disks. Once swapped out the memory space occupied by the entity is marked as free so that in can be overwritten (i.e. reused) by the network computer.

U.S. Pat. No. 4,868,738, entitled Operating System Independent Virtual Memory Computer System, describes a system capable of performing remote paging of memory entities over a network. U.S. Pat. No. 4,868,738 (Ser. No. 766,024; filed Aug. 15, 1985) is incorporated by reference herein as if printed in full below. The swapper module and TSE of the present invention can be used in conjunction with the swapping mechanism shown in U.S. Pat. No. 4,868,738 to provide secure remote paging. In such an embodiment, the encryption and swapping can be performed by the second processing unit described in the above-referenced patent.

Figure 4:
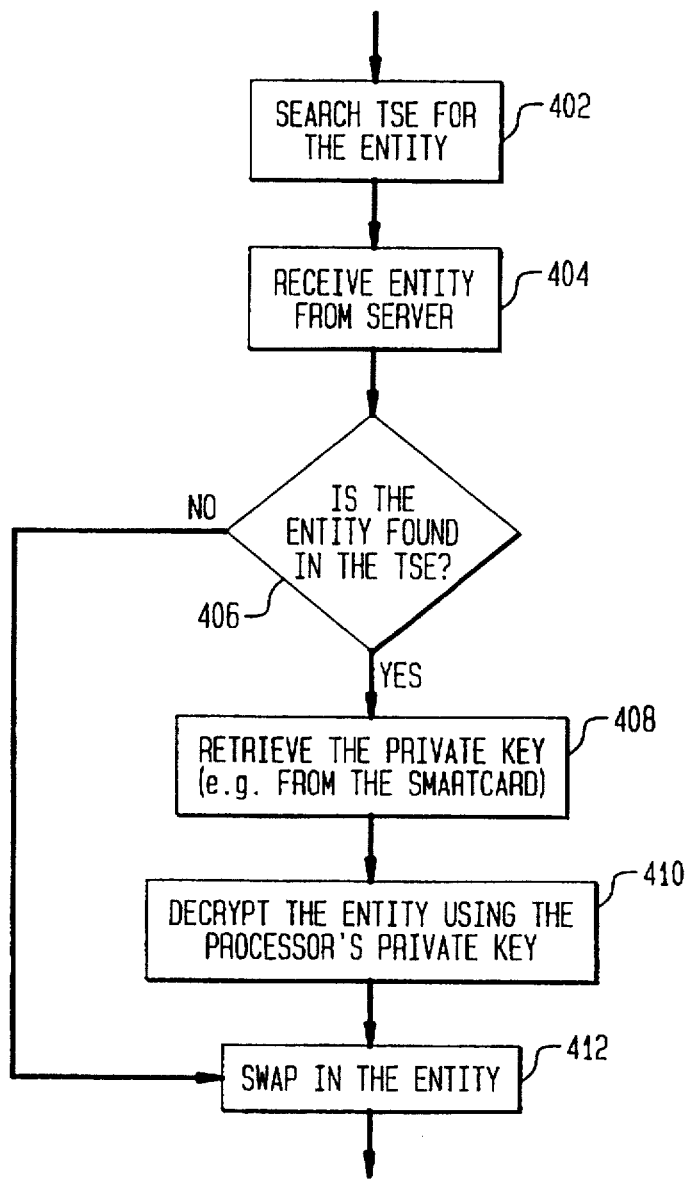
FIG. 4 shows the flow chart for swapping in an entity that was previously saved on a remote network server; and, FIG. 5 is a functional block diagram of modules involved in the preferred embodiment of the present invention.

During the transfer to the server and storage on the server the contents of the entity are secure as they are encrypted. When an entity that has been previously swapped out is needed in the semiconductor memory, the swapper module of the network computer takes the steps shown in FIG. 4. First, in step 402, the swapper module searches the TSE to determined if the entity was registered in the TSE. Independent of whether or not the entity was registered in the TSE, in step 404 the swapper module retrieves the entity from the server via the communication system 110. If, in step 406, it is determined that the entity was registered in the TSE, the swapper module retrieves the private key from the smartcard (step 408) and then decrypts the retrieved version of the entity using the private key (step 410). The entity (whether originally encrypted or not) is then made available to the requesting program (step 412) by the swapper module placing it in the memory. The private key is retrieved from the SmartCard device for use in the decryption step. Once again, during the transfer of the data from the server disk to the network computer, the contents of the entity remain secure. When a secure entity is deleted by the application or the user who had originally created it (or by an application or the user who has the right to delete the entity), the entity is deleted from the TSE as well as from the network computer.

The methods used to free up memory space and perform swapping are know in the art and conventional. Thus, they will not be discussed in more detail here.

Figure 5:
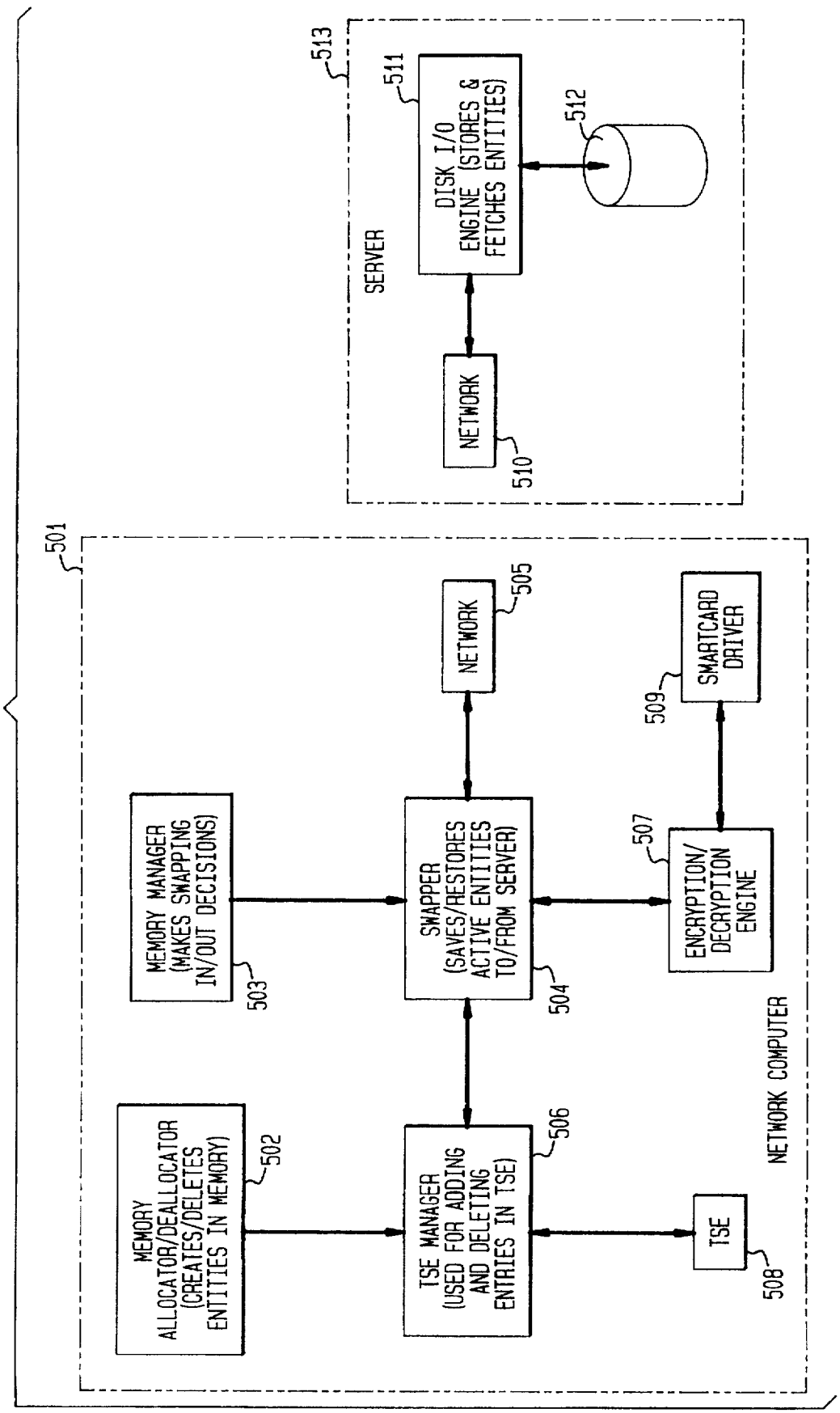

The modules involved in an embodiment of the present invention are shown in FIG. 5. The modules can be embodied in software, hardware or a combination of both. The network computer and the server are numbered 501 and 513 respectively. The modules that reside in the network computer are numbered 502 through 509. The memory allocator/deallocator 502, the memory manager 503, the swapper 504 and the TSE manager 506 are referred to as the "virtual memory management system".

The memory allocator/deallocator 502 creates and destroys memory resident entities as requested by applications and users. Specifically, in response to creation of a memory resident entity by the memory allocator/deallocator, the TSE manager 506 adds an entry in TSE if the entity requires security. Similarly, in response to deletion of a memory resident entity by the memory allocator/deallocator, the TSE manager 506 removes any entry for the deleted entity from TSE.

There are several methods by which information indicating the need for secure swapping (or lack thereof) can be specified and communicated to the TSE manager. The TSE manager can be accesed using a number of service calls for the purpose of communicating security requirements. The service calls can be made by an application program or by the operating system. For example, an application program can be hardcoded to make a service call to the TSE manager indicating which entities require secure swapping (e.g. specific data structures formed by the application). Alternatively, or in addition, the application can provide an interactive user input which indicates whether security is required. In this embodiment, the application can make a service call in response to the interactive input. Further, the system can be provided with administrator selectable system management options to protect specific entities or types of entities (e.g. code segments). When the security options for a memory resident entity are changed, the TSE manager responds by creating (where security is now required) or deleting (where security is no longer required) the corresponding entry from the TSE.

The TSE is shown as the module numbered 508. The memory manager 503 decides which memory resident active entities should be swapped out or swapped in. The swap out process is triggered when the free memory available in the network computer falls below a certain limit, and the swap in process is triggered when a user or an application attempts to access an entity that has been swapped out to the server. When the memory manager determines that a page needs to be swapped in or out it signals the swapper 504. In response, the swapper consults the TSE 506, uses the encryption/decryption engine 507 if needed, and transfers the entity to and from the server via the network 505.

The transfer of entities from the client to the server can be accomplished in conjunction with a generalized version of the caching file server described in U.S. Pat. No. 5,452,447 (Ser. No. 995,423; filed Dec. 21, 1992) which is incorporated by reference herein as if printed in full below. The above-referenced patent describes a system capable of transferring contents of a file from a remote processing unit to a client and placing the contents in the virtual memory of the client. The system is also capable of transferring newly created file contents from the client to the server. The system of U.S. Pat. No. 5,452,447 can be modified (generalized) to transfer any memory resident entities (not necessarily limited to file objects) and the generalized system for transferring can be incorporated into the swapper 504, network interfaces 505, 510 and the disk I/O engine 511 of FIG. 5.

The encryption/decryption engine uses the SmartCard driver 509 to obtain the encryption and decryption keys as needed. The encryption/decryption engine can be embodied, for example, as described in U.S. Pat. No. 4,218,582 (Ser. No. 839,939; filed Oct. 6, 1977), which is incorporated by reference herein as if printed in full below.

On the server, swapping in and out of entities is supported using the network, shown in the server as 510, and the disk input/output engine 511 and the disk subsystem 512. Note that the entity is transferred in and out of the server in an encrypted form if the entity requires security.

Now that the invention has been described by way of the preferred embodiment, various modifications and improvements will occur to those of skill in the art. For instance, the scheme can be generalized in the following ways: First, even though this invention has been described using the public key encryption technology, it can be realized using any secure encryption scheme. Second, the Table of Secure Entities (TSE) could be replaced by a flag in the page table entry that notes if the data contained in the page is sensitive or not. Lastly, a diskless system could instead encrypt every entity that is being remotely swapped out, and thus simplify the implementation at the cost of encryption overhead, as all entities may not usually require security. Thus, it should be understood that the preferred embodiment has been provided as an example and not as a limitation. The scope of the invention is defined by the appended claims.

We claim:

1. A method for swapping memory resident entities in a virtual memory of a computing system wherein a virtual memory management system performs the steps of:

detecting when a memory resident entity needs to be swapped out of the virtual memory of the computing system;

in response to the detecting, determining whether the memory resident entity requires secure swapping;

when it is determined that the memory resident entity requires secure swapping, encrypting the memory resident entity to form an encrypted entity;

requesting transfer of the encrypted entity to a remote node by way of a communication interface; and, freeing memory locations previously occupied by the memory resident entity.

2. The method of claim 1 comprising the further steps of making a service call from a computer program executing on the computing system to a memory management subsystem on the computing system, the service call indicating whether the memory resident entity requires secure swapping; and, in response to an indication that the memory resident entity requires secure swapping storing an indicator in a data structure formed in the memory of the computing system, wherein the detecting comprising examining the data structure.

3. The method of claim 2 wherein the data structure includes an entry for each memory resident entity requiring secure swapping.

4. The method of claim 3 comprising the further step of deleting the entry for a given memory resident entity from the data structure when the service call indicates that secure swapping is no longer required.

5. The method of claim 1 wherein the encrypting is public key encryption.

6. The method of claim 5 comprising the steps of storing a key required for decrypting the memory resident entity in the memory of the computing system.

7. The method of claim 6 comprising the further steps of:

determining when the memory resident entity needs to be swapped back in to the computing system;

receiving the encrypted memory resident entity via the communication interface;

decrypting the memory resident entity using the key;

storing the memory resident entity in the virtual memory.

8. A method for swapping memory resident entities in a virtual memory of a computing system wherein a virtual memory management system performs the steps of:

detecting when an entity needs to be swapped into the virtual memory of the computing system;

in response to the detecting, requesting transfer of the entity from a remote system on which it is stored to the computing system by way of a communication interface;

determining whether the entity is encrypted by reference to a data structure formed in the computing system, the data structure including an entry indicating whether the entity was encrypted when it was swapped out of the virtual memory of the computing system;

when it is determined that the entity is encrypted, decrypting the entity to form a decrypted entity;

storing the decrypted entity in the virtual memory of the computing system.

9. A method for swapping entities resident in a virtual memory of a computing system wherein a virtual memory management system performs the steps of:

in response to an indication from the computing system that a resident entity requires swapping out, examining a data structure formed in the memory to determine whether the entity requires secure swapping;

when it is determined that the entity requires secure swapping, encrypting the entity to form an encrypted entity and storing a key required to decrypt the entity;

requesting transfer of the encrypted entity to a remote node by way of a communication interface of the computing system.

10. The method of claim 9 wherein the entity is a data unit determined by an application program with which the data unit is associated.

11. The method of claim 9 wherein the entity is specified by a user.

12. The method of claim 9 comprising the further steps of: in response to an indication from the computing system that the entity requires swapping in, examining the data structure to determine whether the entity was encrypted when it was swapped out, requesting that the entity be transferred from the remote node to the computing system by way of the communication interface, and decrypting the entity using the key if the entity is encrypted.

13. The method of claim 9 wherein the key is not provided to the remote node.

14. The method of claim 9 wherein the key is stored on a removable nonvolatile memory card.

15. The method of claim 9 wherein the data structure includes a entry for each entity which has been swapped out in encrypted form.

16. The method of claim 9 wherein the indication includes data identifying a type of entity that is to be encrypted when it is swapped.

17. The method of claim 16 wherein the type of entity is executable code.

18. An apparatus for memory management of a virtual memory in a computing system, comprising:

a virtual memory system including a random access memory;

a table of secure entities formed in the memory system;

a virtual memory management system coupled to the table of secure entities, the virtual memory management system being operative to determine when an entity resident in the random access memory requires secure swapping by, at least in part, examining the table of secure entities;

an encryption/decryption engine coupled to the virtual memory management system, and, a network interface coupled to the memory system;

wherein in response to a determination that the entity requires secure swapping, the virtual memory management system signals the encryption/decryption engine to encrypt the entity, stores an encryption key in the virtual memory system and signals the network interface to transfer an encrypted version of the entity to a remote node.

19. The apparatus of claim 18 further comprising a memory card interface and means for storing the key on a removable memory card coupled to the memory card interface.

20. The apparatus of claim 18 further comprising an application interface coupled to the virtual memory management system for receiving an indication from an application whether an entity associated with the application requires encryption prior to swapping.

* * * * *